United States Patent Office 3,275,152
Patented Sept. 27, 1966

3,275,152
SUSPENSION SYSTEM FOR CENTRIFUGAL
EXTRACTORS
Walter W. R. Searle, Beaconsfield, England, assignor to
The Hoover Company, North Canton, Ohio, a corporation of Ohio
Filed Mar. 5, 1964, Ser. No. 350,147
Claims priority, application Great Britain, Jan. 19, 1960,
1,993/60
13 Claims. (Cl. 210—364)

This application is a continuation-in-part of application Serial No. 76,296, filed December 16, 1960, and now abandoned.

This invention relates to certain new and useful improvements in a suspension system for centrifugal extractors of which the following is a full, clear and concise description.

The present invention relates to domestic laundry machines and more particularly to a dynamic suspension for a centrifugal extractor of the type having a spin basket rotatably mounted in a non-rotatable tub or drum in which the tub is dynamically suspended to permit relative movement, within limits, between the tub and its supporting framework without transmitting any appreciable alternating vibration to the supporting framework.

While the invention is shown and described herein as applied to a combined washer and spin extractor it is equally as applicable to any centrifugal extracting apparatus.

An object of this invention is to suspend a tub on a frame in such a manner that the tub is free to oscillate without transmitting impact forces to the frame and movement of the tub axially rearward is prevented.

According to the broader aspects of the present invention a spin basket is mounted for high speed rotation in a non-rotary tub, on an inclined axis, in which the tub is dynamically mounted by resilient suspension means reacting on the tub in a direction generally perpendicular to the axis of rotation of the basket but in which the movement of the tub longitudinally of the axis of rotation is restricted by a pair of links attached at their rear ends to the sides of the tub and extending upwardly and forwardly generally parallel to the axis of rotation of the basket and being attached to the supporting framework by a differential or equalizing mechanism which permits forward movement of one link with a corresponding rearward movement of the other link while preventing rearward movement of the tub as a unit.

Thus the tub is supported in an inclined position by a sort of V-shaped truss arrangement with the apex of the V positioned downwardly and the legs of the V at right angles to each other. The spring suspension supports the component of the weight of the unit at right angles to the incline of the unit and would permit the unit to swing backwardly were it not for the links which support that component of the weight of the unit along the angle of incline and prevent rearward movement of the unit in its entirety.

The spring suspension permits relatively free vertical movement of the unit about the upper ends of the links as a pivot point while the differential mechanism permits lateral swinging movement of the unit, the spring suspension acting as a sort of pendulum during such movement.

During actual centrifuging operations, with the basket rotating at high speed, the entire suspended unit moves in an orbit about its inclined axis resulting in both vertical and sideward movement which is permitted but movement of the suspended unit along its axis of incline is restricted.

As will appear hereinafter, the suspended unit oscillates in a cone shaped orbit which requires the sides of the suspended unit to move forwardly and rearwardly to some extent during such orbital movement. The differential mechanism of the support of the present invention freely permits such movement.

The forward upper end of the tub is attached to the casing of the machine at the access opening by an annular corrugated flexible bellows to permit the tub to oscillate and to prevent leakage of water into the casing on the outside of the tub.

The motor and the transmission for rotating the spin basket are carried by the bottom of the tub so that the center of gravity of the unit in that condition would be well to the rear of the geometric center of the clothes receiving space of the spin basket and thus to the rear of the source of unbalance when the basket is rotated at high speed.

If the basket should be rotated at high speed under such conditions the oscillatably supported unit would oscillate in an orbital path in the shape of a wide mouthed cone having its apex just to the rear of the machine.

Such an arrangement would cause difficulty with the flexible bellows joining the tub to the casing at the access opening and would require excess space to permit the upper forward end of the tub to oscillate.

According to the present invention, an annular weight is attached to the tub at its mouth just to the rear of the bellows. The weight has sufficient mass to move the center of gravity of the oscillatably supported unit to a point adjacent and to the rear of the geometric center of the clothes receiving space of the spin basket.

With that arrangement, when the spin basket is rotated at high speed, the oscillatably supported unit will oscillate in an orbital path in the shape of a narrow mouthed cone with its apex well to the rear of the machine or in an orbital path which is almost cylindrical so that the mouth of the tub will have but little radial movement. Thus the bellows problem will be minimized as well as the problem of providing space for the oscillation of the upper end of the tub.

The ideal situation would be to have the suspended unit oscillate on a cylindrical orbit in which case the sides of the suspended unit would not move rearwardly and forwardly during such orbital movement. However, that is impracticable in practice and the support of the present invention provides for forward and backward movements of the suspended unit by the provision of the differential mechanism by which the links are attached to the supporting framework.

The restriction in movement of the tub along the axis of rotation of the basket also contributes to minimizing the space and bellows problems.

In the present invention the lower ends of heavy springs are attached to the sides of the tub on a horizontal line slightly to the rear of and above the center of gravity of the suspendesd unit, which as previously stated is near the geometric center of the clothes receiving space. The upper ends of the heavy springs are attached to appropriate points of the supporting framework so that when the links are applied the unit will be inclined at an angle of approximately 30° to the horizontal.

The ends of the links are attached to the outside of the tub at the same points as the lower ends of the heavy supporting springs. The links then extend upwardly and forwardly substantially parallel to the inclined axis of the unit, and connects to a differential mechanism on the supporting framework.

The links are of such length and the differential mechanism is so mounted that the oscillating unit will take its 30° inclined position with the two heavy springs extending upwardly and rearwardly at substantially right angles to the inclination of the unit.

Since the lower ends of the heavy supporting springs and the ends of the links are attached to the tub at points rearwardly of the center of gravity of the unit, the unit would tip forwardly if that were its only support. To prevent that the lower ends of light supporting springs are attached to the sides of the tub forwardly of the center of gravity of the supported unit and extend upwardly and rearwardly substantially parallel to the heavy supporting springs with their upper ends attached to appropriate points of the supporting framework.

The offset of the suspension point of the unit rearwardly of its center of gravity and the use of the light springs renders the axis of incline less dependent upon the position of the center of gravity of the suspended unit, which may vary from unit to unit, and less dependent upon the weight and distribution of the clothes in the basket.

The location of the supports, the action of the links and the addition of the weight to the forward end of the tub all contribute to an arrangement by which, during spin drying operations, the tub as a whole will orbit in a path of movement about the axis of rotation of the basket due to the unbalance of the clothes in the basket but in which the amplitude of the oscillations are small and vibrational impulses transmitted to the frame are negligible.

Other objects and advantages of the invention will become apparent as the description proceeds when taken in connection with the accompanying drawings in which.

Figure 3:
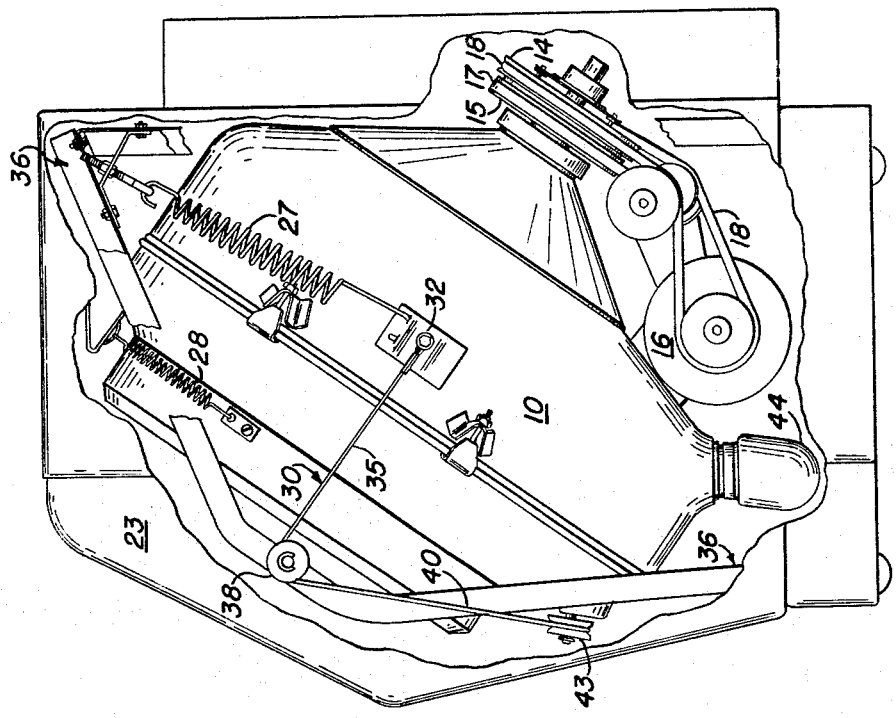
Figure 4:
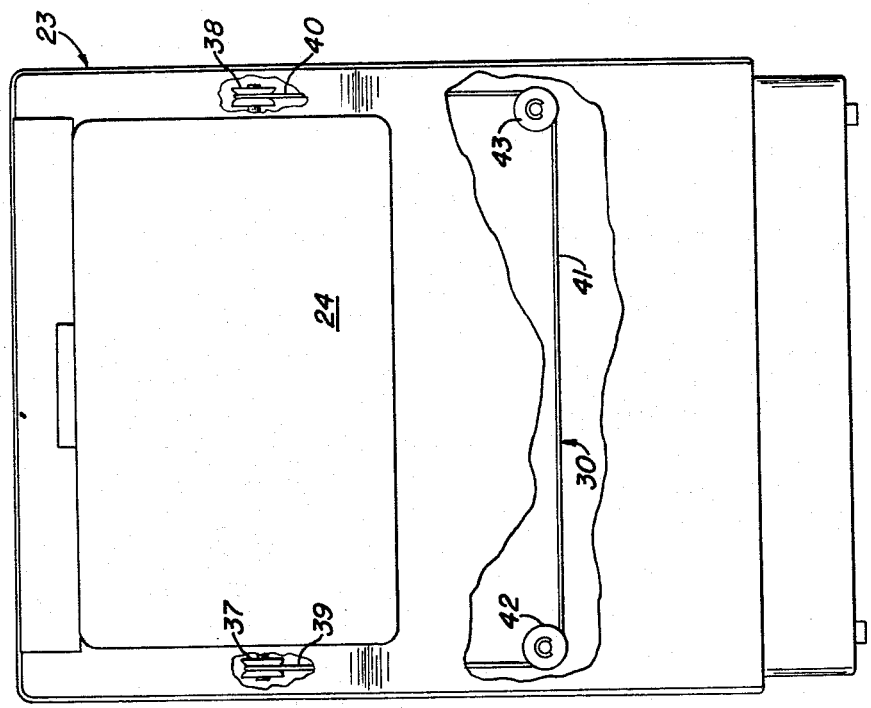
Figure 9:
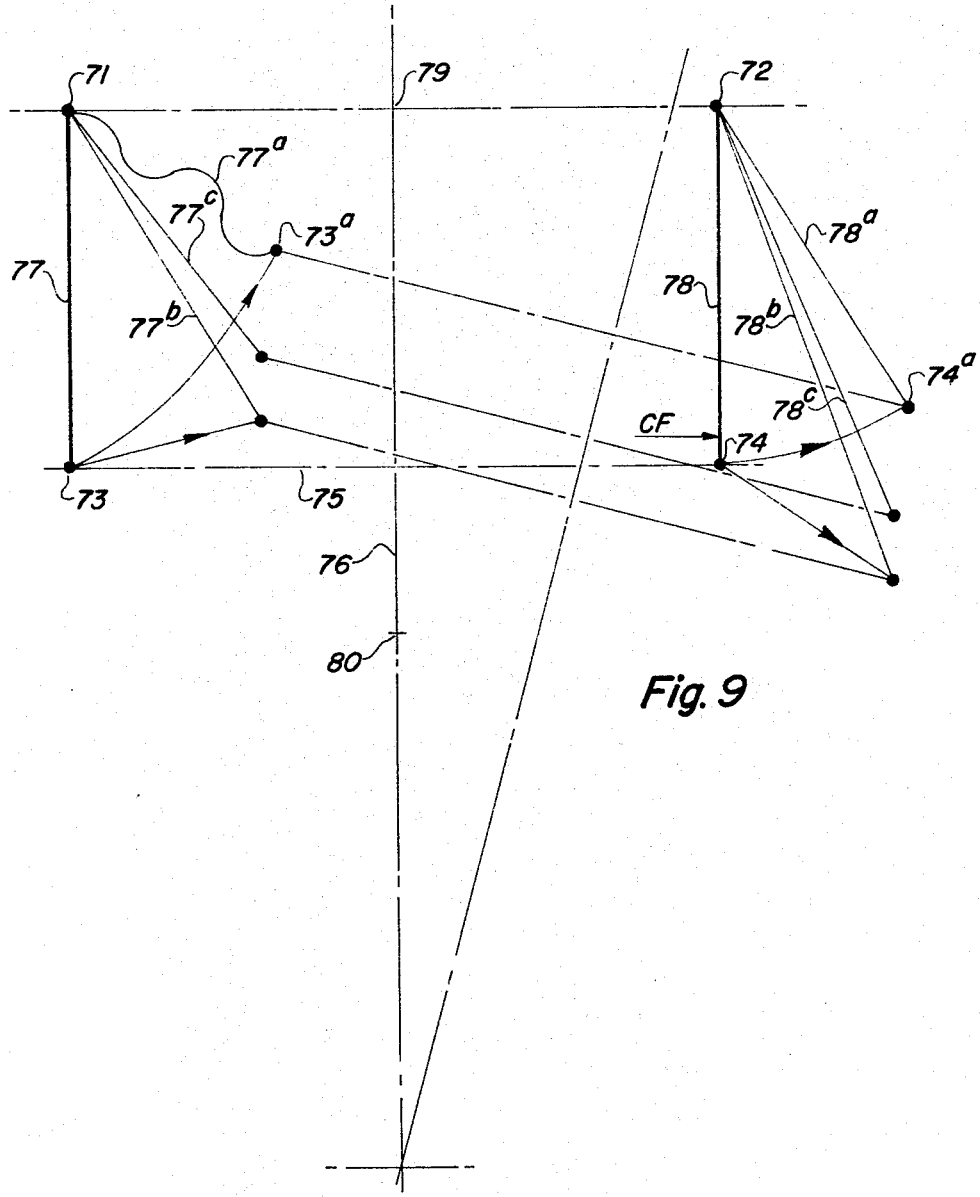

FIG. 3 is a side view of an actual machine constructed in accordance with the present invention with the cabinet walls broken away to show how the support is applied and omitting other details of construction which are not necessary to an understanding of the invention; and FIG. 4 is a front view of the machine of FIG. 3 with the cabinet walls broken away to show how the cable and pulleys are arranged and omitting other details of construction not necessary to an understanding of the invention;

FIGS. 5–8 are perspective views showing alternative embodiments of the linkage supporting system;

FIG. 9 is a diagrammatic sketch comparing the support of the present invention with other supports.

Figure 1:
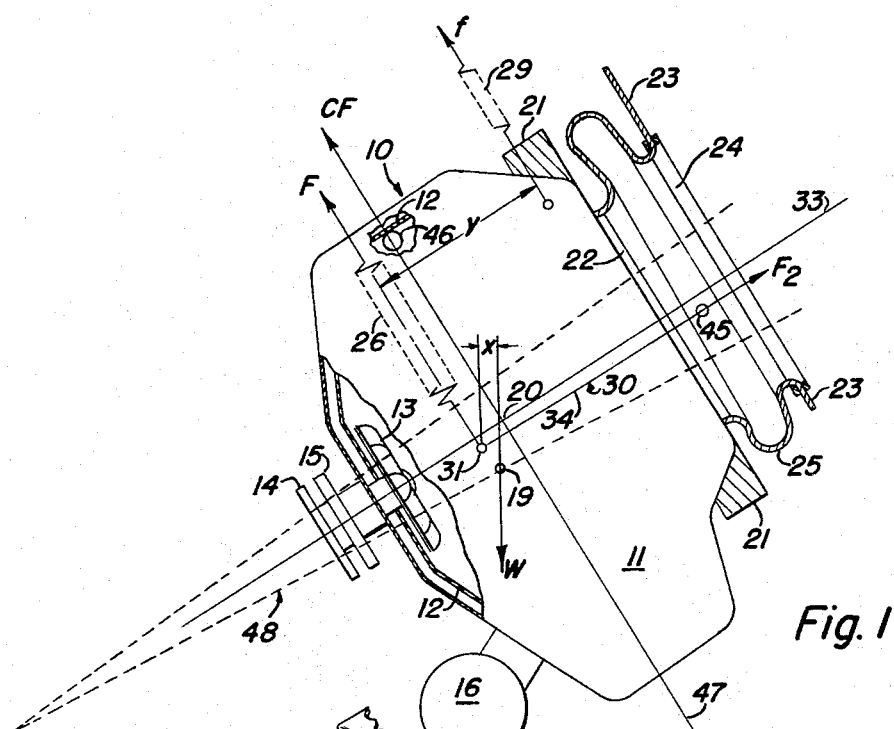
FIG. 1 is a schematic representation of the support of the present invention.

FIG. 9 is a sketch showing various supporting systems for a tub such as that in FIG. 1. Points 71 and 72 represent points of attachment on the tub supporting framework or cabinet. Points 73 and 74 represent points of attachment of the suspension means to the tub. Centerline 75 represents a horizontal axis through the tub passing through points 31 of FIG. 1. Centerline 76 represents the longitudinal axis of the tub and spin basket.

In an ideal system, center of gravity 19 in FIG. 1 would be located at the intersection of lines 33 and 47. The ideal suspension means would then be a single cable connected to the center of gravity and extending along axis 33 to a point of connection on the supporting framework. The single cable would serve the purpose of preventing movement of the tub axially rearward and rotation of the spin basket would cause the axis 33 to generate a cylinder.

Such a system is impractical because the center of gravity and the plane of unbalance shift with different wash loads in the spin basket. Also, a single cable would have to run through the center of the tub opening and the interior of the tub would be cluttered up with a means for attaching the single cable at the center of gravity.

The suspension of the present invention closely approximates the ideal system.

In practice, the center of gravity and the plane of unbalance will usually not coincide, and the eccentricity will cause the axis of the tub to oscillate so that it generates a cone rather than a cylinder.

In FIG. 9 numerals 77 and 78 represent fixed lengths of cable, which have been used in prior art devices. The centrifugal force CF will move points 73 and 74 sideways and point 74 will move to point 74$^a$. The eccentricity of force CF with respect to point 74 will also tend to rotate the tub about point 74. Thus, point 73 will be forced toward point 71 as well as sideways. This causes cable 77 to go slack as at 77$^a$. All of the supporting force will then be in cable 78$^a$ which is very eccentric with respect to the center of gravity of the tub and will cause even greater unbalance. When the force CF acts on the other side of the tub, due to rotation of the spin basket, point 73$^a$ will move sideways and downward very rapidly causing a large impact load to be transmitted to the supporting frame when cable 77$^a$ becomes taut. It is easy to see that this type of suspension does not approximate the ideal system.

If elements 77 and 78 were springs they would move approximately to positions at 77$^b$ and 78$^b$. Spring 78$^b$ would be under much greater tension than spring 77$^b$ and the total supporting force would be eccentric with respect to the center of gravity of the tub. Springs also have a tendency to put back into the system as much energy as they take out and this would cause greater oscillations of the tub. Also, springs would not prevent movement of the tub axially rearward and the tub to frame distance would not be stable.

In the present invention numerals 77 and 78 represent legs or links of a continuous cable or linkage system. Since the legs or links are interconnected, one cannot be under a greater force than the other. Under sideways and oscillatory movements legs 77$^c$ and 78$^c$ will not go slack, and they will be under approximately the same tension because a greater force acting on leg 78$^c$ is immediately transferred to leg 77$^c$. As a result, the total supporting force will always act substantially through point 79. Of course, legs 77$^c$ and 78$^c$ will not always remain parallel and the supporting force may miss point 79 by a small distance. At any rate, the supporting system of the present invention closely approximates the ideal system and is much better than either fixed lengths of cable or springs. Due to axis 75 being positioned closely adjacent to the center of gravity the supporting force will always pass substantially through, or closely adjacent to the center of gravity. This is more desirable than having the center of gravity far removed from axis 75, say at point 80, because the eccentricity of the supporting force with respect to the center of gravity would cause greater oscillations of the tub.

Referring to the drawings and particularly to FIG. 1 which shows a schematic arrangement of the support of the present invention, the reference numeral 10 represents the entire tub assembly or unit which is mounted for oscillatory movement.

For purposes of illustration the invention has been shown as applied to a combined washing and centrifugal extraction machine of the domestic type, comprising an outer non-rotatable tub or drum 11, inclined at an angle of about 30°, an inner spin basket 12 rotatably mounted within the tub 11, and a rotary agitator 13 inside basket 12 and independently rotatable relative thereto.

The basket 12 and impeller 13 are independently rotated by pulleys 14 and 15 driven by an electric motor 16 by means of belts 17 and 18 (FIG. 3) it being noted that the motor 16 and the driving mechanism for the basket 12 and agitator 13 are carried by the tub 11 and form a part of the unit 10 which is mounted for oscillatory movement as will be explained.

In the machine disclosed the basket 12 is rotated at a slow speed for tumble washing with or without rotation of the impeller 13. For spin extraction the basket 12 is rotated in the same direction at high speed. The vibration of the unit 10 is no problem during washing operations and it is only during high speed rotation of the basket, with an uneven distribution of clothes, that the vibration problem occurs.

In order to position the center of gravity 19 of the resiliently supported unit 10 at a point at or close to the geometric center 20 of the clothes receiving space of basket 12, and annular weight 21 is attached to the tub 11 about its access opening 22. The unit 10 is enclosed within a cabinet 23 having an access opening 24. The top of the tub 11 and the edges of the access opening 24 are connected by a flexible bellows 25 to permit the tub 11 to vibrate and to prevent water from spilling down into the casing 23 about the tub 11.

In FIGS. 1–4 the support for the vibratory unit 10 comprises two heavy or main supporting springs 26 and 27, two light supporting springs 28 and 29 and a steel cable 30.

The main supporting springs are attached to the opposite sides of the tub 11 at points 31 and 32 which lie on a transverse horizontal line slightly above and to the rear of the center of gravity 19 of the unit 10 so as to apply a supporting force F at substantially right angles to the axis 33 about which the basket 12 rotates.

The free ends of the cable 30 are also attached to the opposite sides of the tub 11 at the points 31 and 32 and its legs 34 and 35 extend upwardly and forwardly substantially parallel to the axis 33 so as to apply a supporting force $F_2$ in a direction substantially parallel to the axis 33.

Since the points 31 and 32 to which the springs 26 and 27 are attached are to the rear of the center of gravity 19 the weight W of the unit 10 exerts a turning moment about the points 31 which may be represented by W$x$. To offset that turning moment, the light springs 28 and 29 are attached to the sides of the tub 11 a distance $y$ forwardly of the points 31 and 32 and extend upwardly and rearwardly substantially parallel to the springs 26 and 27 and exert a force $f$ so that the turning moment, $fy$ counterbalances the turning moment W$x$. It will be understood that springs 28 and 29 could be attached to the bottom front, bottom rear, or top rear of the tub rather than to the top front as illustrated.

Figure 2:
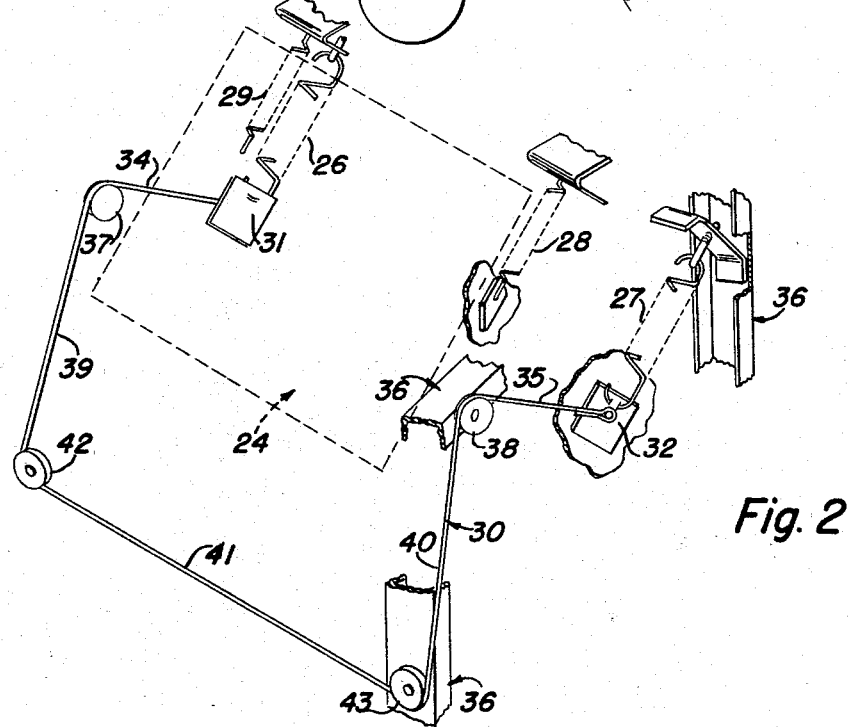
FIG. 2 is a perspective phantom view of the support of the present invention showing how the supporting springs and cable are attached to the tub and to the supporting framework.

As shown in FIGS. 2 and 3 the upper ends of springs 26 to 29 inclusive are attached to the supporting framework generally indicated by the reference numeral 36.

The cable 30 is in the form of a closed loop having downwardly and forwardly extending sections 39 and 40 and a connecting section 41 which pass over pulleys 37, 38, 42 and 43 rotatably mounted on the framework 36.

The pulleys 37 and 38 are mounted well to the side of the access opening 24 and in a position such that the legs 34 and 35 of cable 30 will be substantially parallel to each other and substantially parallel to the axis 33. As shown the pulleys 42 and 43 are mounted below the access opening 24 and in a position such that the sections 39, 40 and 41 of cable 30 will not interfere with the oscillation of the unit 10.

As shown in FIG. 3 the outlet connection 44 is connected to the water inlet and drain system (not shown) by a flexible hose which extends entirely across the width of cabinet 23 so as to permit the unit 10 to oscillate freely except for some slight damping effect which the hose may have.

Again referring to FIG. 1, the point 45 may represent the transverse line on which the legs 34 and 35 of cable 30 pass over the pulleys 37 and 38. Since the cable 30 is in the form of a closed loop the legs 34 and 35 may be said to be the equivalent of rigid links pivoted at points 45 insofar as bodily movement of the unit 10 rearwardly along axis 33 is concerned.

Movement of the unit 10 forwardly along axis 33 is opposed by the force $F_2$, which represents a substantial portion of the weight of the unit 10, and as will appear, while such movement may occur under certain conditions, it is slight and very much restricted.

It is clear that the unit 10 may vibrate upwardly and downwardly about the point 45 as a pivot point, such vibration being permitted by the supporting springs. During such movement the lower ends of the legs 34 and 35 will move in the arc of a circle so the unit 10 as a whole will move slightly forwardly along the axis 33 against the resistance of force $F_2$ which restricts such movement.

Rotary oscillation of unit 10 about axis 33 may take place in a restricted manner. As the lower end of one leg 34 moves up, the lower end of the other leg 35 moves down, each in the arc of a circle about points 45 on opposite sides of the unit 10 so that the unit 10 is moved forwardly along axis 33 against the resistance of force $F_2$ as in the case of vibrations in a vertical direction.

The unit 10 can vibrate substantially freely laterally in the horizontal plane of the axis 33 with the springs acting as a pendulum. Sideward movement of the point 31 (upwards of the paper as viewed in FIG. 1) will shorten the leg 34 but the leg 35 on the opposite side of the unit 10 will be correspondingly lengthened that being permitted by movement of the cable 30 about the pulleys. A reverse sideward movement would lengthen leg 34 and shorten the leg 35. If the cable-pulley system was frictionless the only resistance to such movement would be the supporting springs. Thus the slight friction of the cable-pulley system will dampen lateral vibrations to some extent and will stabilize them to that extent.

The legs 34 and 35 of cable 30 constitute the links of the previously mentioned restricting device and the sections 39, 40 and 41 of cable 30 and the pulleys constitute the differential or equalizing mechanism.

The positioning of the suspension points 31 and 32 upwardly and rearwardly of the center of gravity 19 and the use of the auxiliary springs 28 and 29 renders the position in which the unit 10 hangs, less dependent on the position of the center of gravity 19, which may vary with different units and less dependent upon the weight and distribution of the clothes in the basket 12.

The source of the force which tends to cause oscillation of the unit 10 is the unequal distribution of clothes in the basket 12 which may be represented by a concentrated weight 46 as shown in FIG. 1.

As the basket 12 is rotated at a high speed during a spin extraction operation, centrifugal action acting on weight 46 will cause a force CF to act outwardly against the wall of the basket 12 substantially on the line 47 passing substantially through the geometric center 20 of the basket 12. As the basket 12 rotates the force CF moves in a circle about the axis 33 with the result that the entire unit 10 tends to move in a cone shaped orbit about the line 33 as an axis.

Since the center of gravity 19 of the unit 10 is close to the geometrical center 20 of the basket 12, by reason of added weight 21, the cone of orbit will be narrow mouthed with its apex well to the rear of the machine as shown exaggerated by the dotted line cone 48 of FIG. 1.

The ideal situation would be to have the apex of cone 48 at infinity so that the unit 10 would oscillate on a cylindrical orbit but that is impractical in practice. Under such conditions the points 31 and 32 to which the ends of cable 30 are attached would not move in a direction parallel to the axis 33. However, under the conditions shown, the points 31 and 32 do move slightly rearwardly and forwardly in a direction parallel to axis 33 which is permitted by the differential action of the cable and pulleys.

Actually the oscillation of the tub at the mouth where the bellows 25 is attached will be small and little greater than at the center of gravity of the unit 10. Thus, both the space and bellows problems at the upper front end of the machine are solved.

It is apparent from the above detailed description of the cable suspension system of FIGS. 1–4 that the tub is free to oscillate without transmitting large vibrational forces to the frame and movement of the tub axially rearward is prevented.

It will be apparent to those skilled in the art that other suspension systems could be used to accomplish the same results as achieved with the system of FIGS. 1–4.

FIGS. 5–8 illustrate some alternative embodiments which perform the same functions as the embodiment of FIGS. 1–4. It is to be understood that springs 26–29 will also be used with the embodiments of FIGS. 5–8 and the relative points of connection of the springs and links will be the same in the embodiments of FIGS. 5–8 as they are in the embodiment of FIGS. 1–4.

Figure 5:
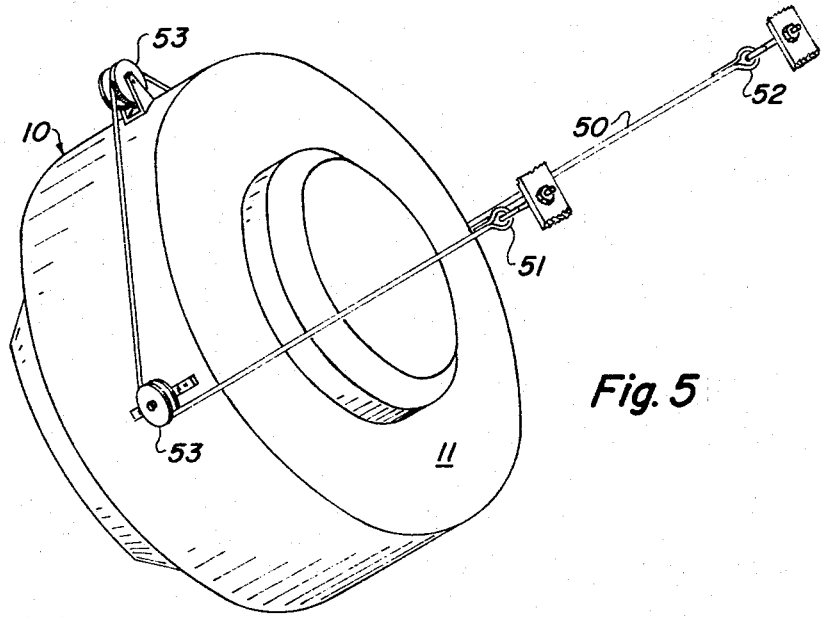

FIG. 5 shows cable 50 having its free ends 51 and 52 secured to the frame rather than to the tub, and pulleys 53 secured to the tub rather than to the frame.

Figure 6:
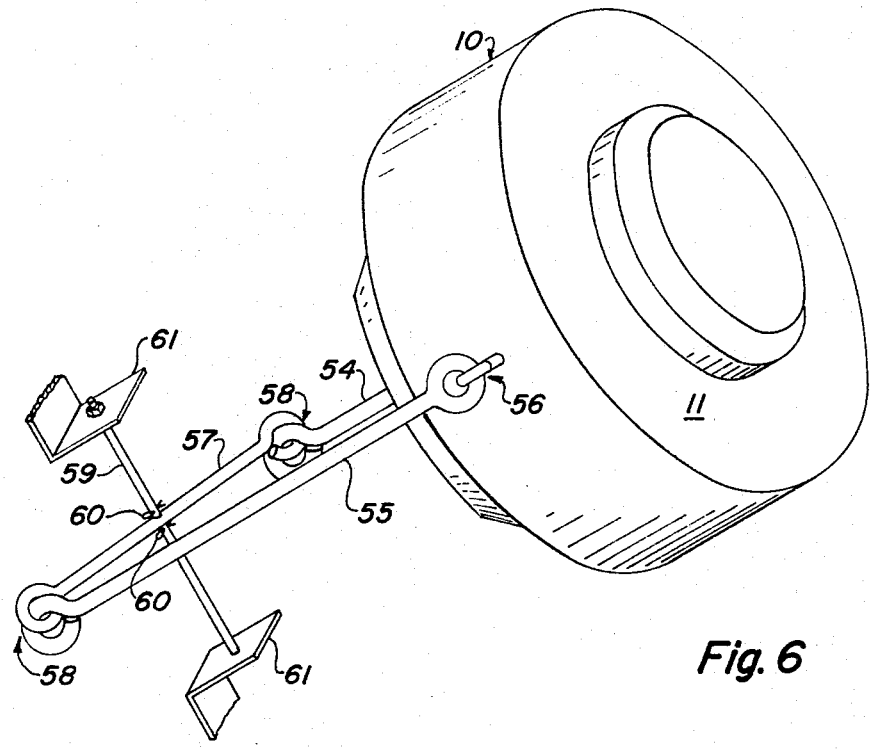

FIG. 6 shows links 54 and 55 pivotably secured to tub 11 as at 56 and to cross link 57 as at 58. Cross link 57 is rotatably mounted on rod 59 and held in position as by cotter pins 60. Rod 59 is mounted on frame brackets 61. The intersection of cross link 57 and rod 59 lies substantially on the tub axis, and rod 59 is substantially perpendicular to the tub axis and to cross link 57.

Figure 7:
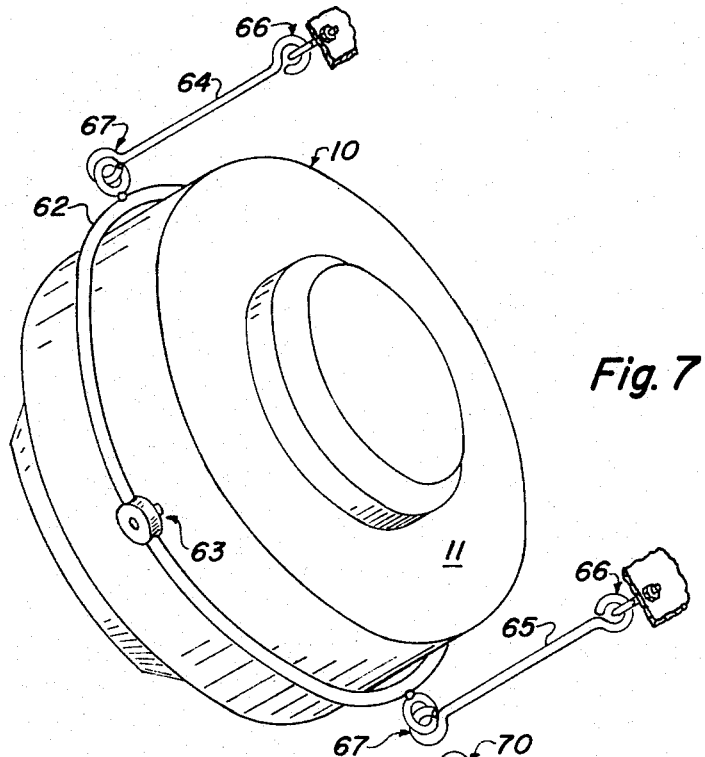

In FIG. 7 ring 62 is pivoted to the tub at two points as at 63. Links 64 and 65 are pivotably secured to the frame as by connections 66 and to the ring by connections 67.

Figure 8:
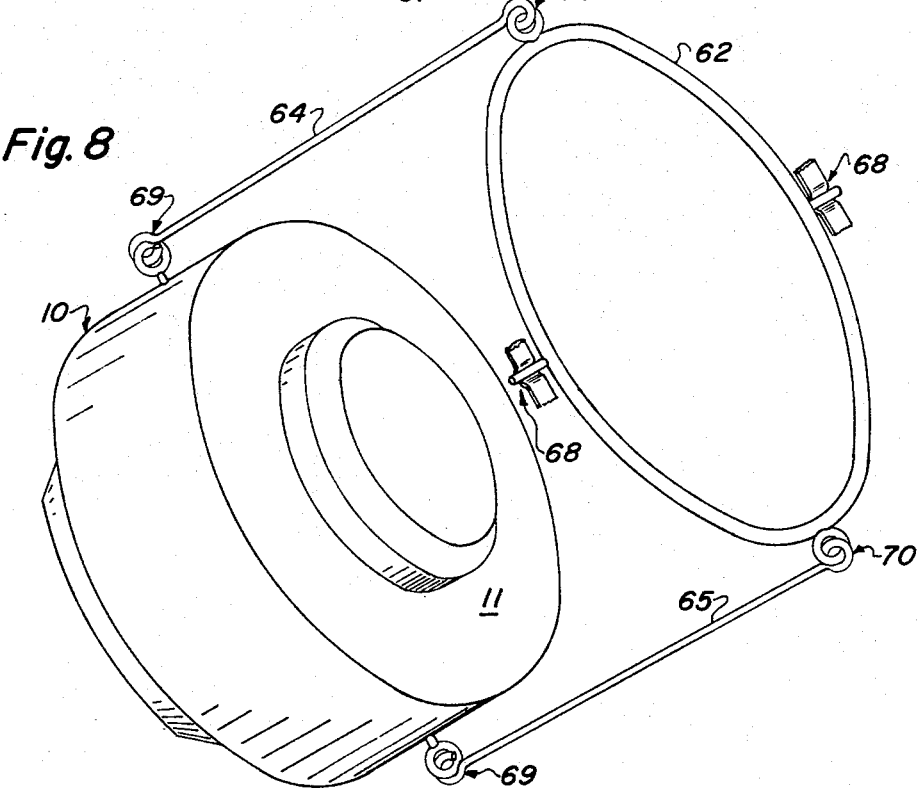

In FIG. 8 the suspending device of FIG. 7 is reversed and ring 62 is pivoted to the frame as by connections 68 rather than to the tub. Links 64 and 65 are pivoted to the tub by connections 69 and to the ring by connections 70. It is to be noted that in FIG. 8 links 64 and 65 are connected to the top and bottom of the tub rather than to the sides. Points of connection 69 lie substantially in the plane which passes through point 31 of FIG. 1 at right angles to axis 33.

Any of the other embodiments could be connected with the links at the top and bottom of the tub rather than at the sides. Thus, the tub and suspension system would only have to be rotated 90 degrees and the points of attachment to the frame relocated.

The support of the present invention permits the body 10 to oscillate relative to the frame 36 and instead of transmitting the vibrations produced by an unbalanced load in the basket 12 to the frame in a series of alternating shocks, the transmission of the oscillations of body 10 to the supporting framework is rather continuous and produces little reaction tending to move the machine about during spin extraction operations.

The support of the present invention is sufficiently stable for ordinary washing operations where high speed vibrations do not occur as well as dynamic enough to permit oscillation of the suspended unit 10 during high speed extracting operations, without transmitting appreciable alternating forces to the supporting framework.

I do not wish to be limited to the particular structures shown and described but wish to include all equivalent variations thereof except as limited by the scope of the claims.

I claim:

1. A centrifugal extractor comprising; a first structure defining a supporting framework, a second structure including a non-rotary tub, a spin basket having a longitudinal axis, said basket being mounted for rotation in said tub about said axis, a suspension system mounting said second structure on said first structure with said axis of said spin basket inclined to the vertical, said suspension system including resilient means attached to said first and second structures and applying an upward force to said second structure in a direction substantially perpendicular to said axis of said spin basket, said suspension system further including differential supporting means movably attaching said second structure to said first structure for limited relative movement of said second structure with respect to said first structure in any direction except axially rearward, the movement of said second structure when said spin basket is rotating being such that any point on said axis of said spin basket substantially generates a circle, said differential supporting means being secured to said first structure by attaching means, said attaching means lying in a reference plane which is substantially perpendicular to the said axis of said spin basket and spaced from said second structure in a direction axially of said axis of said basket, said axis intersecting said plane at a point, said differential supporting means providing a supporting force which always acts substantially through said point under all normal conditions of use of said extractor.

2. The centrifugal extractor of claim 1 wherein said differential supporting means comprises a linkage device defined by parallel spaced apart first and second non-extensible leg portions and a non-extensible connecting portion pivotally connecting said first and second leg portions, said first and second leg portions each having a free end, said free ends being pivotally secured to one of said structures, and said connecting portion being movably attached to the other of said structures.

3. The centrifugal extractor of claim 1 wherein a load spinning in said spin basket produces a centrifugal force which defines a plane of unbalance intersecting said axis at substantially right angles, the center of gravity of said second structure being located closely adjacent said intersection of said plane of unbalance and said axis, said upward force supplied by said resilient means acting substantially through said center of gravity.

4. The centrifgual extractor of claim 3 wherein the point of attachment of said resilient means to said second structure is spaced a small distance from the center of gravity along the line of and in the direction of the force supplied by said resilient means so that a turning moment acting about said point of attachment is produced by the weight of said second structure acting through said center of gravity, and additional resilient means attached to said first and second structures providing a counter moment to said turning moment.

5. A centrifugal extractor comprising: a first structure defining a supporting framework, a second structure defining a non-rotary tub, a spin basket mounted for rotation in said tub, a suspension system mounting said second structure on said first structure with the axis of said spin basket inclined to the vertical, a plane of unbalance intersecting said axis at substantially right angles, said plane of unbalance being defined by the centrifugal force resulting from a load spinning in said spin basket, the center of gravity of said second structure being located closely adjacent said intersection of said plane of unbalance and said axis, a bisecting plane bisecting said second structure into substantially equal upper and lower portions, said axis of said spin basket lying in said bisecting plane, said suspension system including resilient means secured to said first and second structures and applying an upward force to said second structure in a direction substantially perpendicular to said axis of said spin basket, said upward force acting substantially through said center of gravity, first attachment means on said second structure lying substantially in said bisecting plane, said resilient means being secured to said first attachment means, second attachment means on said first structure lying substantially in said bisecting plane, said suspension system further including differential means movably attaching said second structure to said first structure for limited relative movement of said second structure with respect to said first structure in any direction except axially rearward, said differential means being defined by parallel spaced apart first and second non-extensible leg portions and a non-extensible connecting portion, said first and second leg portions each having a free end, said free ends being pivotally secured to one of said attachment means, said connecting portion being movably held by the other of said attachment means, whereby said first attachment means on said second structure is free for limited relative movement with respect to said second attachment means on said first structure.

6. The centrifugal extractor of claim 5 wherein said first attachment means on said second structure is horizontally spaced a small distance from said center of gravity thereby causing a turning moment about said first attachment means due to the weight of said second structure acting through said center of gravity, and additional resilient means attached to said first and second structures providing a counter moment to said turning moment.

7. A centrifugal extractor comprising: a first structure defining a support, a second structure defining a non-rotary tub, a spin basket mounted for rotation in said tub, a suspension system mounting said second structure on said first structure with the axis of said spin basket inclined to the vertical, said suspension system including resilient means secured to said first and second structures and applying an upward supporting force to said second structure in a direction substantially perpendicular to said axis of said spin basket, a plurality of pulleys mounted on one of said structures, attachment means on the other of said structures, a length of cable trained over said pulleys on said one structure and having its free ends secured to said attachment means on said other structure.

8. The centrifugal extractor of claim 7 wherein said plurality of pulleys are mounted on said second structure and said plurality of pulleys includes more than two pulleys, two of said pulleys being mounted on opposite sides of said second structure on an axis which passes closely adjacent to the center of gravity of said second structure and is substantially perpendicular to said axis of said spin basket, the other of said plurality of pulleys being attached to the periphery of said second structure between said two pulleys on opposite sides of said second structure.

9. A centrifugal extractor comprising: a supporting framework, a non-rotary tub; a spin basket mounted for high speed rotation within said tub; a suspension system mounting said tub on said framework with the axis of said basket inclined to the vertical; said suspension system including resilient means applying a supporting force in a direction approximately at right angles to said axis, a non-extensible cable for supporting said tub against substantial movement longitudinally of said axis with the free ends of said cable forming a pair of links extending upwardly and forwardly approximately parallel to said axis, means for attaching the lower ends of said links to the sides of said tub on a horizontal line passing through said tub adjacent to the center of gravity of said unit and means for slidably attaching the upper ends of said links to said framework, the closed loop of said cable forming differential means constructed to provide for simultaneous movement of said links in opposite directions substantially parallel to said axis.

10. An extractor according to claim 9 in which said resilient means includes a pair of heavy tension springs attached at their lower ends to the sides of said tub at the points of attachment of said links and extending upwardly and rearwardly approximately perpendicular to said axis and attached at their upper ends to said framework.

11. An extractor according to claim 10 including a pair of light balancing tension springs attached at their lower ends to the sides of said tub forwardly of the center of gravity of said unit and attached at their upper ends to said framework.

12. An extractor according to claim 9 in which said links and differential means are in the form of a closed loop cable and multiple pulley system with the ends of said cable being attached to the sides of said tub and the pulleys being mounted on said framework so that the attached ends of said cable may move simultaneously in opposite directions parallel to said axis by movement of said cable over said pulleys.

13. A centrifugal extractor comprising: a first structure defining a supporting framework, a second structure including a non-rotary tub, a spin basket having a longitudinal axis, said basket being mounted for rotation in said tub about said axis, a suspension system mounting said second structure on said first structure with said axis of said spin basket inclined to the vertical, said suspension system including resilient means attached to said first and second structures and applying an upward force to said second structure in a direction substantially perpendicular to said axis of said spin basket, said suspension system further including a pair of parallel spaced apart links having free ends and connecting ends, a cross-member pivotally connected to said connecting ends of said pair of links for pivotal movement in all directions, means securing said free ends of said pair of links to one of said structures for pivotal movement in all directions, said pair of links lying in substantially a common plane with the axis of said spin basket, means pivotally securing said cross member to the other of said structures for rotation about an axis which is substantially perpendicular to the axis of said spin basket and bisects the distance between said connecting ends of said pair of links.

References Cited by the Examiner

UNITED STATES PATENTS

| | | | |
|---|---|---|---|
| 2,296,259 | 9/1942 | Breckenridge | 68—24 |
| 2,643,538 | 6/1953 | Bruckman et al. | 68—24 |
| 2,968,174 | 1/1961 | Bell et al. | 68—24 |
| 2,987,189 | 6/1961 | Evjen | 210—364 |
| 2,987,190 | 6/1961 | Bochan | 210—364 |
| 3,021,956 | 2/1962 | Bochan | 210—364 |
| 3,060,764 | 10/1962 | Sibbald | 68—24 X |

REUBEN FRIEDMAN, *Primary Examiner.*

J. DE CESARE, *Assistant Examiner.*